March 23, 1954  D. S. BUSHNELL  2,672,911
SKID CHAIN APPLYING DEVICE
Filed May 17, 1952
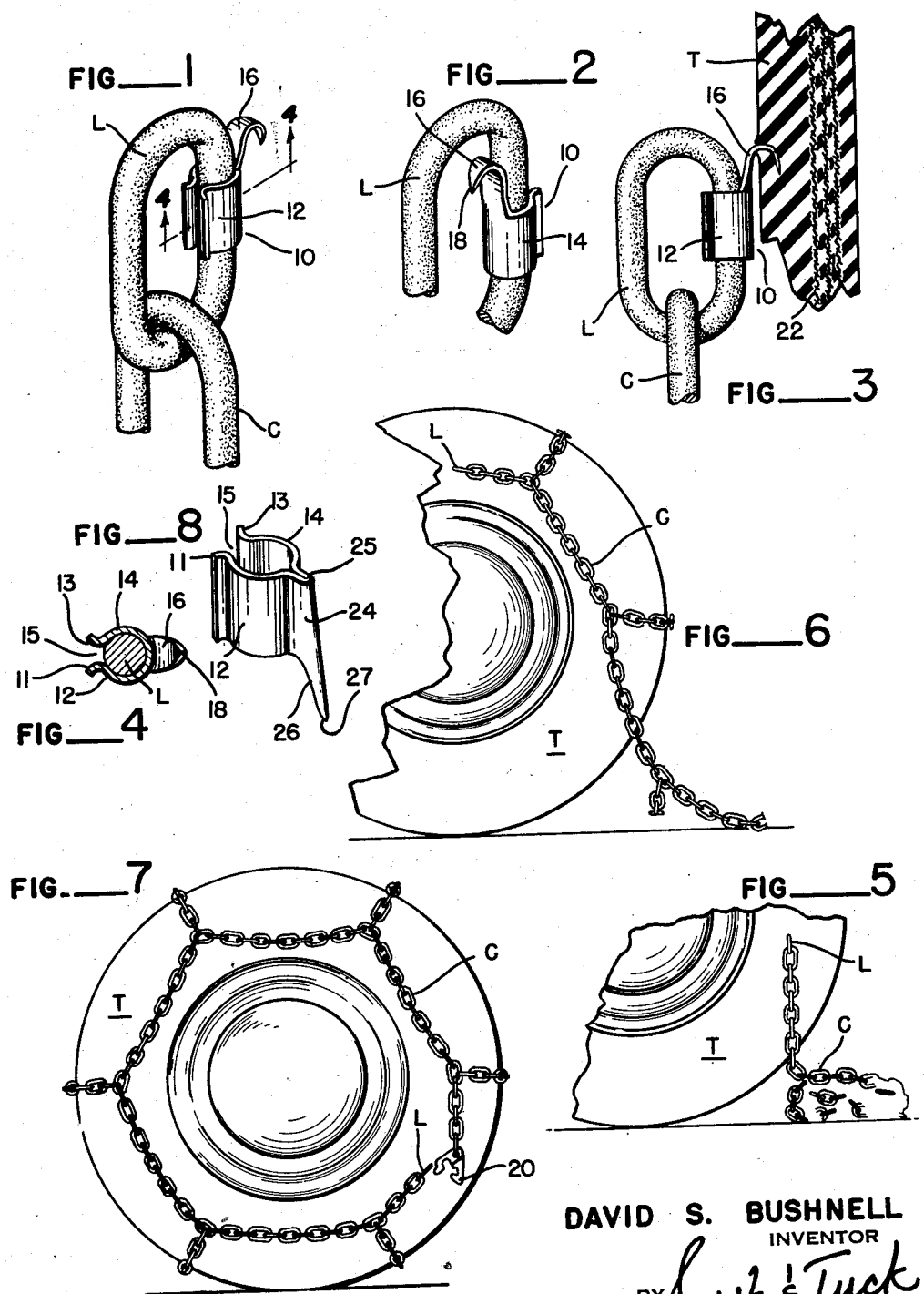
DAVID S. BUSHNELL
INVENTOR Patented Mar. 23, 1954

2,672,911

UNITED STATES PATENT OFFICE 2,672,911

SKID CHAIN APPLYING DEVICE

David S. Bushnell, Seattle, Wash.

Application May 17, 1952, Serial No. 288,486

4 Claims. (Cl. 152—213)

My invention relates to means for attaching automobile tire chains without jacking up the automobile, and, more specifically, to skid chain applying device. Briefly, this structure includes a clip member on the end links of the chain having hook means to be imbedded in the sidewall of the tire when applying the chain to the tire. The clip members are rotatable on the links so they may be positioned inside of the links when not in use.

The task of applying tire chains to automobiles in snow or ice has for a long time made winter driving uncomfortable and the motorist may dangerously neglect to apply chains because of the difficulty in attaching the chains. In the city the garage mechanic is available to apply the chains to a car. The city, however, is not where the chains are needed since the heavy flow of traffic keeps the streets in a relatively safe condition. On the other hand when the driver leaves the city and drives on rural roads or highways the traffic is lighter and the roads are dangerous without tire chains on the car. When the driver finds he needs chains, the service stations are few and far between, forcing him to apply tire chains alone.

Automotive designers in their quest for speed and beauty have dropped the automobile closer to the road with the tires rotating within deep fender wells. This makes the bulk of the tire inaccessible and the application of tire chains is a dirty and tiresome job.

Previous attempts have been made to solve this problem but the solution has been evasive. While the problem has been readily recognized, previous solutions have been to provide a chain attaching device entirely separate from the chain itself. These devices lie loose in the trunk of the car most of the year and, when the tire chain is applied, the attachment is often temporarily laid to rest on the ground while the final locking of the chain takes place and then is forgotten. When the attachment is lost or mislaid, the driver is forced back to the former methods of chain application.

The primary object of my invention, therefore, is to provide a tire chain attaching device permanently affixed to the tire chain and adapted to grip the tire so that the chain is spread around the tire when the tire is rotated.

A further object of my invention is to provide a tire chain with a means for gripping the tire which is an integral part of the chain but which will be retained in a position so as to avoid contacting the tire while the chain is on the tire.

A further object of my invention is to provide tire chain attaching means which contact only the sidewall of the tire so that as the tire is rotated the tire does not roll over the attaching means and possibly dislodge the same.

Further objects and capabilities will be apparent from the disclosure in the drawings in which:

Figure 1 is a perspective view of my attaching device as applied to a tire chain in its engaging position;

Figure 2 is a perspective view of my attaching device in its retracted position;

Figure 3 is a fragmentary elevational view, partially in section, showing my attaching means in engagement with a tire;

Figure 4 is a cross-sectional view taken along line 4—4 of Figure 1;

Figures 5, 6, and 7 are fragmentary elevational views showing successive steps during the application of a tire chain with my attaching device; and Figure 8 is a perspective view of a modified form of my gripping device.

Referring now to the disclosure in the drawings the numeral 10 designates generally my tire chain attaching device in its primary form. These attaching devices are used in pairs so that one will contact the outer sidewall of the tire and the other contact the opposite sidewall.

The entire attaching device is formed as a unitary structure preferably of spring steel and is plated to prevent corrosion. Although I have found this to be the best material, other materials might be used with satisfactory results. The clips may be sold installed on a set of new chains, or separately, to the motorist who owns a set of chains having no attaching means; and they may also be removed from a worn set of chains and placed on a new set.

In order to grip the tire chain I have provided a C-shaped body portion having sidewalls 12 and 14 adapted to encircle partially one side portion of a tire chain link L. The end of sidewalls 12 and 14 are bent outwardly forming opposed guide lips 11 and 13 with the restricted opening 15 separating these. Opening 15 must normally be smaller than the diameter of the chain link stock so as to grip the link but during the application of the attaching device to the link, sidewalls 12 and 14 must be distorted to the extent that opening 15 will allow the passage of link L therethrough. This forms a grip on the link so that it can be rotated by the fingers, to the desired position, and held there by the spring tension.

Extending from the upper margin of the closed end of the body portion is a tire gripping finger 16. This gripping finger extends above the body portion and is bent outwardly therefrom in a U-shaped pattern to provide a downwardly extending free end 18. This free end is provided with a sharp point for engaging the tire. While in the drawings I have shown the tire engaging finger formed entirely above the uppermost limit of the body portion, this is not essential to the device as the free end of the U-shaped tire engaging finger may be of greater or lesser length which would alter the relative position of the tire engaging point.

As shown in Figure 8 of the drawing, the construction of my attaching device may be altered from the preferred embodiment. In the illustrated variation the main C-shaped body portion is similar in design and identical in function with that of the primary design with only the tire gripping portion being altered. Here, the sidewalls 12 and 14 extend from the opening 15 along the surface of the chain link and then are bent outwardly from the chain link in juxtaposition forming a flange 24. This flange terminates in the joining of the sidewalls as at 25. The distance which this flange extends outwardly from the link may vary but it should not be greater than the width inside the chain link so that this extended flange may rotate around the side portion of the link and not contact the opposed side portion of the same. The lower edge of flange 25 as viewed in Figure 8 is curved downwardly to form an acute angle with the outermost margin. This forms a sharp point at 27 where the outermost margin and the beveled edge 26 meet.

My tire chain attaching devices are manually placed on the chains in the following manner. First the extending guide lips 11 and 13 are placed astraddle the side of the link to be attached. Pressure is then exerted upon the closed end of the C-shaped body portion while holding the link L against movement. This pressure causes the guide lips to pass along the walls of the link causing the C-shaped body portion to open until the expanding points pass the center of the link stock whereupon the slot 15 starts to close around the other side of the link stock. This action continues until the position of Figure 1 is obtained. When a second chain attaching device has been similarly secured to a link on the opposed longitudinal band of this chain it may then be attached to the tire.

Method of operation

When my chain attaching device is in the position of Figure 1 the tire chain C is placed upon the ground just behind the tire to which it is to be attached. One of the links L, to which my device is secured, is then raised and placed so that the sharp point of gripping finger 18 contacts the sidewall of the tire T. A slight downward pressure is then applied and the point bites into the tire in the manner shown in Figure 3. Point 18 of finger 16 is formed so as not to penetrate the tire wall as far as fabric reinforcement 22. This operation is repeated with the other link L on the opposed sidewalls of the tire and the position shown in Figure 5 is achieved. The car is now moved forward through the position of Figure 6 to the position of Figure 7 which is just one revolution of the tire. With a slight upward pressure on link L the gripping finger 18 is withdrawn from the tire. The motorist removes the gripping finger from the tire and rotates the gripping device to the position of Figure 2 and then secures the chain by lock 20 in the usual manner. The gripping devices remain in this retracted position during use and until the chains are again to be applied insuring that the tire walls will not be scarred, protecting the sharp point from damage, and making the chains safe to handle.

Having thus disclosed the invention, I claim:

1. An anti-skid chain for vehicle tires, comprising: two side chains provided with joinder means at their ends to form an annular ring at each side of a tire and laterally joined by a plurality of cross chains to pass across the tire tread, and a chain anchor revolvably attached to a side bar of adjacent terminal links of each side chain, each of said chain anchors being in the form of a resiliently gripping, open-sided, snap-on cylinder formed of spring metal and fitting closely to the side bar of such a chain link, each chain anchor having a pointed hook outstanding from that side of the cylinder opposite its open side, said hook being shaped to permit insertion into the side wall of a tire and being directed longitudinally of the cylinder away from the terminal end of the associated side chain and toward the other end thereof.

2. The structure according to claim 1 in which the pointed hook is formed of a flat, sharpened band of metal integral with and outstanding from one end of the gripping cylinder and bent so that its pointed end is directed toward the other end of the cylinder.

3. The structure according to claim 1 in which the pointed hook includes an integral flange outstanding from the side of the cylinder opposite its open side, said flange having a sharp pointed extension to engage in the tire casing.

4. The structure according to claim 3 in which the flange progressively increases in its outstanding relationship relative the cylinder and at its widest dimension has a pointed extension.

DAVID S. BUSHNELL.

References Cited in the file of this patent

UNITED STATES PATENTS

| Number | Name | Date |
|---|---|---|
| 1,397,818 | Moore | Nov. 22, 1921 |
| 2,609,027 | Locke | Sept. 2, 1952 |

FOREIGN PATENTS

| Number | Country | Date |
|---|---|---|
| 798,045 | France | May 8, 1936 |